United States Patent [19]

Todd et al.

[11] Patent Number: 4,943,752

[45] Date of Patent: Jul. 24, 1990

[54] PIEZOELECTRIC INCANDESCENT LAMP TEST DEVICE

[76] Inventors: Philip A. Todd, 11456 Dumbarton Dr., Dallas, Tex. 75228; Bobby R. Walker, 1300 Lansdowne Dr., Arlington, Tex. 76012

[21] Appl. No.: 241,882

[22] Filed: Sep. 8, 1988

[51] Int. Cl.$^5$ .................... H01L 41/08; G01R 31/22
[52] U.S. Cl. .................... 310/339; 324/414; 324/537; 324/555
[58] Field of Search .............. 310/339; 324/537, 555, 324/414

[56] References Cited

U.S. PATENT DOCUMENTS

| | | | |
|---|---|---|---|
| 1,190,308 | 7/1916 | Levy | 324/537 |
| 3,040,243 | 6/1962 | Weiss | 324/414 |
| 3,063,006 | 11/1962 | Steinberger | 324/555 |
| 3,068,460 | 12/1962 | Uhrig | 324/555 |
| 3,214,689 | 10/1965 | Outen | 324/51 |
| 3,425,049 | 1/1969 | Robinson | 340/214 |
| 3,725,780 | 4/1973 | Olin | 324/414 |
| 3,760,266 | 9/1973 | Ocasio | 324/51 |
| 3,782,258 | 1/1974 | Boekkooi | 95/11.5 |
| 3,808,418 | 4/1974 | Conard | 240/10 |
| 4,025,817 | 5/1977 | Wollachleger | 315/241 |
| 4,523,261 | 6/1985 | West | 362/192 |
| 4,595,864 | 6/1986 | Stiefelmeyer | 315/246 |
| 4,748,366 | 5/1988 | Taylor | 310/328 |

Primary Examiner—Mark O. Budd
Attorney, Agent, or Firm—Richards, Medlock & Andrews

[57] ABSTRACT

A piezoelectric circuit (10, 70, 100) is provided which can be employed in a wide variety of applications. The circuit (10) can be used to test the bulbs in a string (14) of Christmas Tree lights and, in a modified circuit (200) can use any suitable high voltage source (202) as a substitute for the piezoelectric crystal. The circuit (100) can also be mounted in a shoe (64), fishing lure (46), toy (56) or any other suitable application to light a light source (19). In another circuit (70) by positioning a capacitor (72) in parallel with the crystal (16) and light source (62), and positioning a normally open switch (74) between the capacitor and light source, the capacitor can be charged by repeated striking of the crystal. The circuit (70) can be used in the pedal (30) of a bicycle to generate a flashing light easily visible at night. The circuit (70) can also be mounted in a camera (90) or emergency light (36) or any other suitable application.

2 Claims, 4 Drawing Sheets

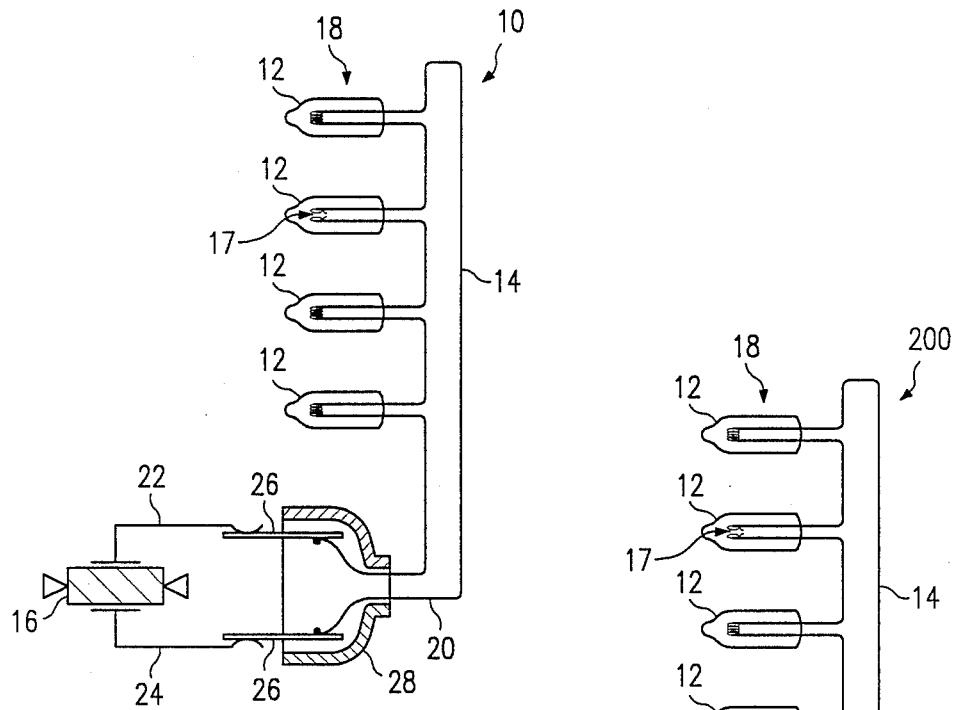
FIG. 1
FIG. 1a
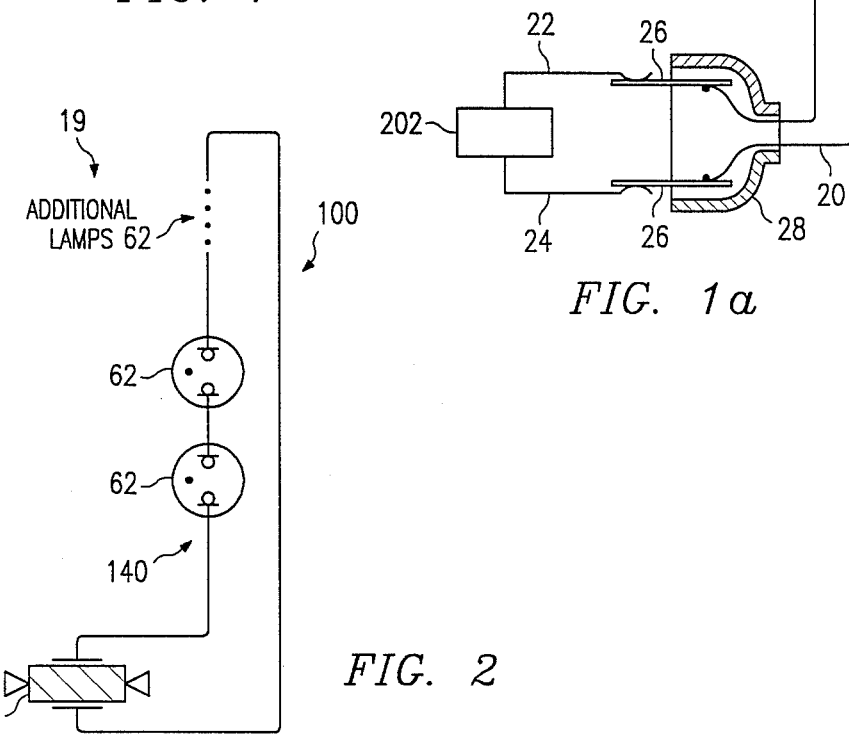
FIG. 2

PIEZOELECTRIC INCANDESCENT LAMP TEST DEVICE

TECHNICAL FIELD

This invention relates to applications for a piezoelectric crystal, such as for testing incandescent light bulbs.

BACKGROUND OF THE INVENTION

The basic phenomena of a piezoelectric crystal is well known. If the crystal is struck, or exposed to a sudden shock, the crystal will generate electrical potential of relatively high voltage. This phenomena has been applied in industry as, for example, a voltage test device disclosed in U.S. Pat. No. 3,425,049 to Robinson. Other means for testing lamp circuits have been disclosed in U.S. Pat. No. 3,760,266 to Ocasio and U.S. Pat. No. 1,190,308 to Levy. The use of piezoelectric crystals has been applied to non-incandescent light sources such as gas filled discharge tubes as disclosed in U.S. Pat. No. 3,808,418 to Conrad, U.S. Pat. No. 4,523,261 to West and U.S. Pat. No. 4,748,361 to Taylor. However, the art has not recognized or fully appreciated the advantages of the Piezoelectric crystal and its applications for testing incandescent light bulbs.

SUMMARY OF THE INVENTION

In accordance with one aspect of the present invention, a piezoelectric circuit is provided which includes a piezoelectric crystal, electrically activated light source, and structure for electrically connecting the piezoelectric crystal to the light source to conduct a voltage generated at the piezoelectric crystal to the light source.

The various applications of this circuit can, for example, include a check for burned out bulbs in a Christmas tree light string by inducing a voltage across the bulbs. The burned bulb will have a gap in its filament, across which an arc will jump to generate a flash, indicating a burned out bulb. The circuit can be used in other applications, such as a fishing lure or toy, as part of a lure or toy activated by movement of the lure or toy, or any other suitable application.

In accordance with another aspect of the present invention, the piezoelectric circuit includes a capacitor connected in parallel between the piezoelectric crystal and the light source. A normally open switch isolates the light source from the capacitor and piezoelectric crystal so that repeated activation of the piezoelectric crystal charges the capacitor to a predetermined level. The switch can then be closed to activate the lamp. Such a circuit would have applications in, for example, the flash of a camera, a flashing light on a bicycle activated by rotation of the bike pedal, and an emergency signal light.

BRIEF DESCRIPTION OF THE DRAWINGS

For a more complete understanding of the present invention, and for further advantages thereof, reference is now made to the following Detailed Description taken in conjunction with the accompanying drawings, wherein:

FIG. 1 illustrates a piezoelectric circuit used for a Christmas light tester forming a first embodiment of the present invention;

FIG. 1A illustrates a Christmas light tester using an alternative high voltage source;

FIG. 2 illustrates a schematic of a modified circuit incorporating light sources.

DETAILED DESCRIPTION

Figure 3:
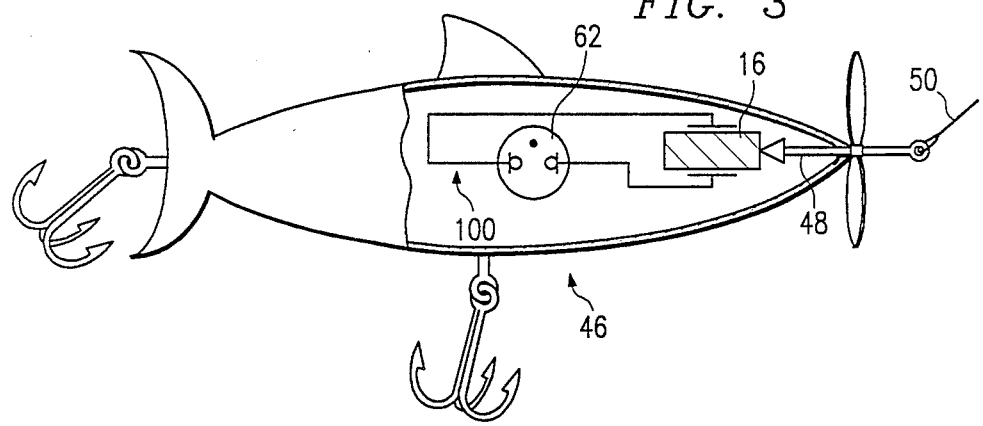
FIG. 3 illustrates a fishing lure using a piezoelectric circuit.

With reference now to the accompanying drawings, and more specifically to FIGS. 1-6, various applications of piezoelectric circuits 10 and 100 are illustrated which incorporate the basic circuit 10, as best illustrated in FIG. 1 or the basic circuit 100, as best illustrated in FIG. 2.

FIG. 1 illustrates an application of the piezoelectric circuit 10 in checking incandescent light bulbs 12 within a string 14 of Christmas lights. The piezoelectric circuit includes a piezoelectric crystal 16, which, when struck by an object or otherwise subjected to sudden impact, generates an electrical potential of relatively high voltage. The circuit further includes electrically activated light source 18, which in the embodiment of FIG. 1, comprises the incandescent light bulbs 12 within the string 14. Further, the circuit 10 includes suitable electrical conductors 20 to electrically connect the crystal 16 with the light source 18. In the embodiment of FIG. 1, leads 22 and 24 extend from the crystal 16 to be connected to the prongs 26 of the plug 28 forming part of the string 14.

If the string 14 no longer works because one of the bulbs has burned out, the leads 22 and 24 are connected to the plug 28 to complete the piezoelectric circuit. A voltage is then generated by crystal 16 by striking the crystal. For example, the piezoelectric crystal and striking element can be of the type commonly provided in butane cigarette lighters for igniting the butane. The high voltage generated will cause a small current to flow through the circuit. Where the filaments of bulbs 12 are complete, the small current will simply flow through the filament without generating a visual signal. However, if a filament in a particular bulb is broken, a gap 17 will exist between the ends of the filament and the current flow will cause a readily visible arc across the gap 17 due to the relatively high voltage generated by the crystal. This clearly identifies the burned out bulb or bulbs for replacement. The use of piezoelectric power in conjunction with incandescent light bulbs is not routinely considered practical because the low current produced by a piezoelectric crystal is not sufficient to heat the filaments to a temperature where they will produce visible light. In the present invention, this phenomena and the high voltage produced by the piezoelectric crystal is uniquely used to identify defective incandescent light bulbs.

FIG. 1A illustrates a circuit 200 which is also used to check bulbs 12 within a string 14 of Christmas lights which employs a source of high voltage 202 other than a piezoelectric source. Source 202 can, for example, be a static generator, such as a Van de Graaf generator or Wimshurst machine, a magnetic generator, such as any coil of wire being cut by magnetic lines of force, an electronic circuit, such as an A.C. or D.C. powered blocking oscillator or a step up transformer, such as a high voltage transformer powered from an A.C. line.

With reference now to FIG. 2, a circuit 100 is illustrated which uses a piezoelectric crystal 16 to light electrically activated light sources 19 through conductors 140. In the embodiment of FIG. 2, the light sources 19 comprise bulbs 62. The bulbs 62 are gas filled with gases such as neon or xenon, which, when ionized by an electrical potential such as that produced by piezoelectric crystals 16, emits light.

With reference now to FIG. 3, the piezoelectric circuit 100 is incorporated for use within a fishing lure 46. Preferably, the striker 48 is positioned between the fishing line 50 and the remainder of the lure 46 so that jerks on the line cause the striker to impact the crystal 16 to light bulb 62 in a random manner to attract fish.

Figure 4:
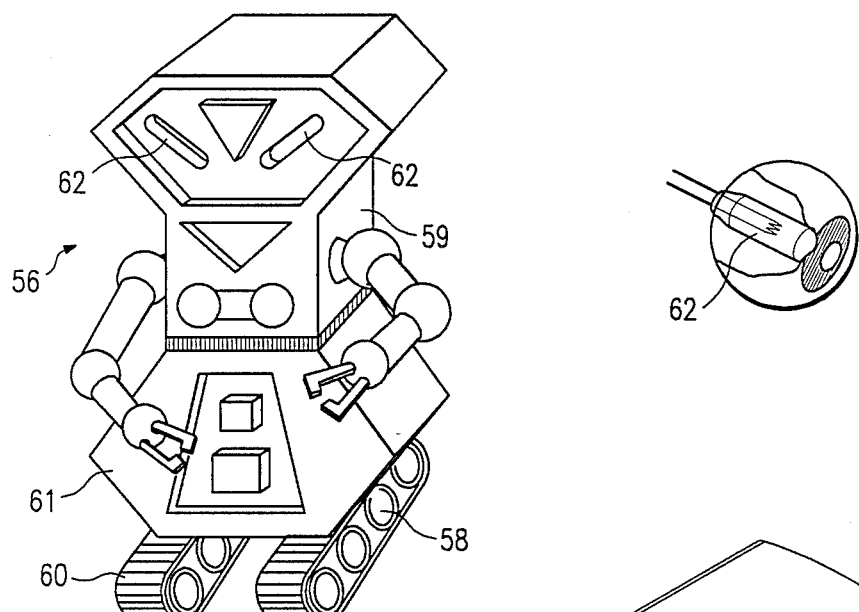
FIGS. 4 and 5 illustrate toys using a piezoelectric circuit.
Figure 5:
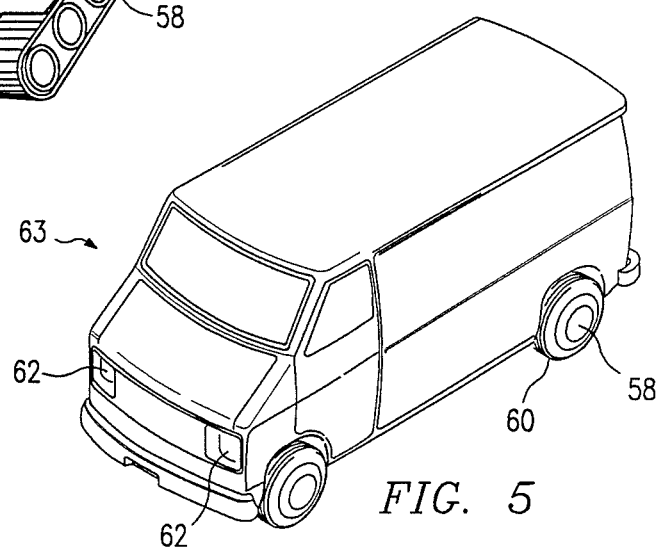

With reference now to FIGS. 4 and 5, the piezoelectric circuit 100 is illustrated used within a toy 56. The striker 58 is mounted within the wheels or tracks 60 of the toy so that when a child pushes the toy, the striker 58 impacts the crystal to light bulbs 62 forming the eyes of the toy. Of course, the striker could be positioned elsewhere within a toy, as for operation when the child rotates the upper body 59 of the toy relative to the lower body 61 of the toy. Further, the configuration of the toy could vary, and, for example, could be a conventional truck 63 with the same circuit as seen in FIG. 2.

Figure 6:
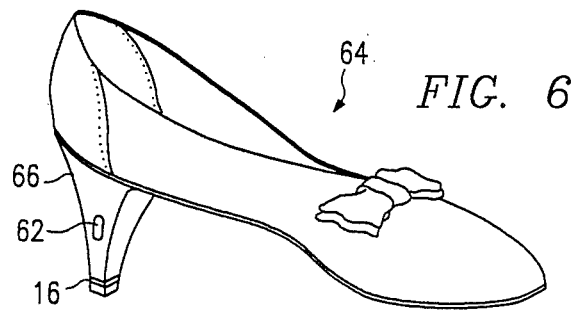
FIG. 6 illustrates a shoe using a piezoelectric circuit.

With reference now to FIG. 6, a shoe 64 incorporates a piezoelectric circuit 100 as a novelty. The crystal 16 is mounted in the heel 66 of the shoe. Every time the heel impacts on the ground, the crystal will generate a signal to light bulb 62 within the heel for a novelty effect. Such a design could also be a safety feature in any type of shoe when walking or jogging, particularly at night.

Figure 7:
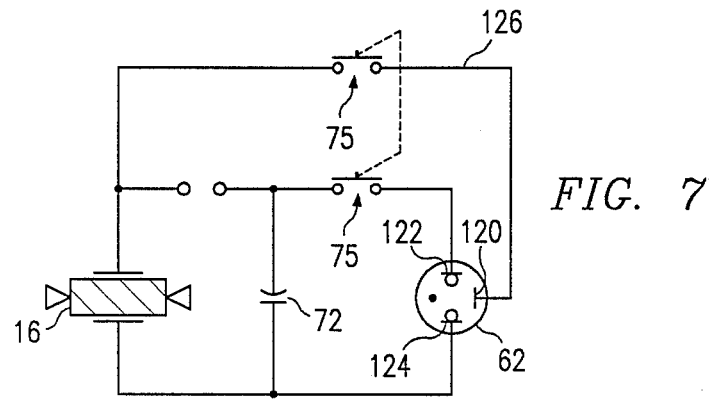
FIG. 7 illustrates a schematic of another embodiment of the present invention incorporating a storage capacitor.

FIG. 7 illustrates a circuit 70 forming a second embodiment of the present invention. Circuit 70 incorporates a capacitor 72 mounted in parallel between the piezoelectric crystal 16 and the electrically activated light source 62. Further, a normally open switch 74 is mounted between the capacitor 72 and the light source 62. In circuit 70, the crystal 16 will be struck repeatedly with switch 74 open to charge the capacitor 72. When the capacitor is charged, closure of switch 74 will discharge the capacitor cross the light source 62. When a light source 62 such as a xenon flash tube is used, a trigger voltage may be required to plate 120 in the tube to initiate the ionization of the gas between contacts 122 and 124. The trigger voltage can be supplied directly from crystal 16 though conductor 126 containing a normally open switch 75.

After sufficient charge has built up in capacitor 72 by repeated striking of crystal 16, the closure of both switches 74 and 75, and the striking of crystal 16 to generate the trigger voltage, results in lighting source 62.

Use of the circuit 70 thus permits a light source 62 to be used which could not be operated by the voltage and current flow generated by a single strike on the crystal 16 as in circuits 10 or 100.

Figure 8:
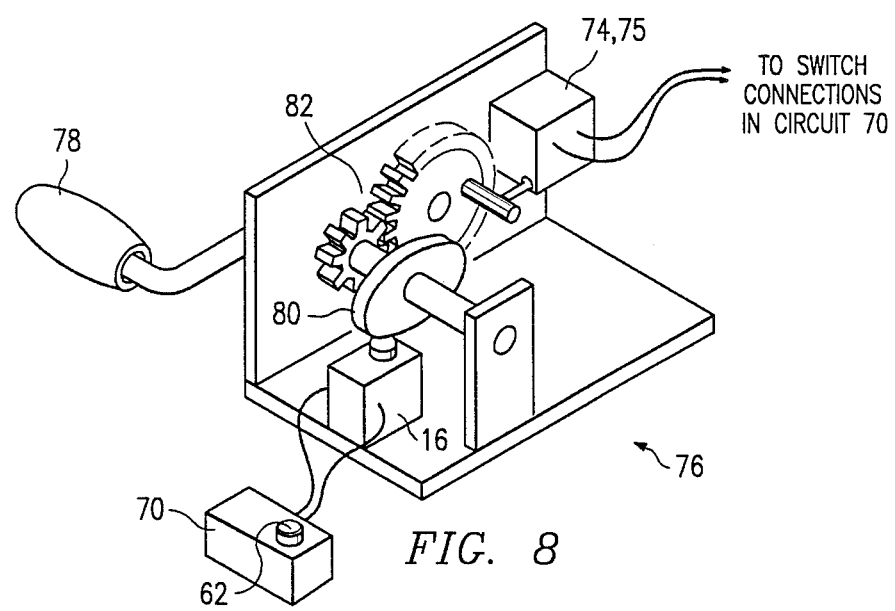
FIG. 8 illustrates a crank mechanism for operating the circuit of FIG. 7.

FIG. 8 illustrates an application of circuit 70 within a manually operated crank assembly 76. A handle 78 is rotated to simultaneously rotate a cam 80 to strike a crystal 16 repeatedly and to rotate gear assembly 82. Gear assembly 82 closes switches 74 and 75 at the proper time to cause the light source 62 to flash.

Figure 9:
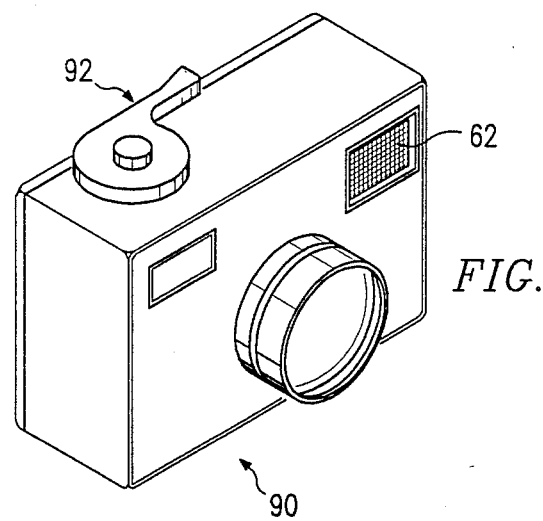
FIG. 9 illustrates a camera incorporating the circuit of FIG. 7 to operate the flash.

FIG. 9 illustrates an application of circuit 70 within a camera 90. The crystal striker forms part of the conventional winding lever 92 so that, as the film is wound, a series of strikes on the crystal generates sufficient charge stored in capacitor 72 to operate the flash 62 of the camera.

Figure 10:
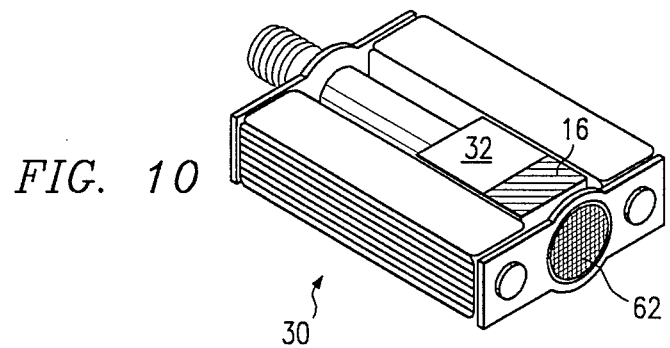
FIG. 10 illustrates a piezoelectric circuit in a bike pedal.

With reference now to FIG. 10, a different application of the piezoelectric circuit 70 is illustrated by use in a bicycle pedal 30. The pedal 30 is mounted for a pivotal motion on a horizontal shaft forming part of the main drive gear of the bicycle. A piezoelectric crystal 16 is mounted in the pedal and a striking element 32 is mounted on the shaft to impact the crystal as the pedal rotates about the shaft. This motion generates a series of voltage pulses from the crystal which are effective to provide power to bulb 62 at the end of the pedal 30 to provide a flashing signal. The signal is a significant safety advantage, as well as being an interesting novelty. The flashing light would be a very significant safety factor when the bicycle was ridden at night.

Figure 11:
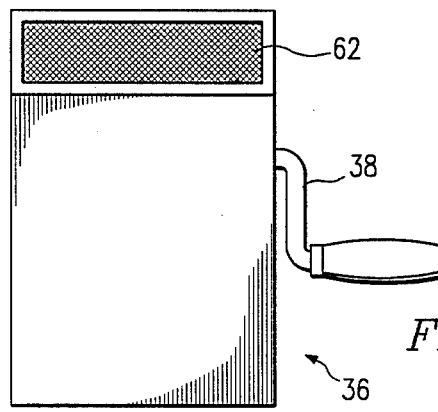
FIG. 11 illustrates an emergency light signal using a piezoelectric circuit.

With reference now to FIG. 11, another application of piezoelectric circuit 70 is illustrated in an emergency light 36. A piezoelectric crystal 16 is mounted in the light 36 for manual activation by a striker 38 such as illustrated in FIG. 8. As the crystal is struck, the charge in capacitor 72 builds up until switches 74 and 75 close to cause the bulb 62 in the emergency light to flash. Because the emergency light 36 requires no external or internal power sources, such as batteries, the light can be stored for lengthy periods of time without concern as to its reliability when needed.

Although several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

We claim:

1. A piezoelectric incandescent lamp test device, the incandescent lamp being tested having a filament, comprising:

a piezoelectric electric crystal;
means for electrically connecting the piezoelectric crystal to the incandescent lamp under test to conduct a voltage generated at the piezoelectric crystal to the incandescent lamp, a break in the continuity of the filament in a lamp causing an arc across a broken filament in a lamp to provide a visual indication of the broke filament.

2. The piezoelectric incandescent lamp test device of claim 1 wherein the incandescent lamp is a bulb in a Christmas Tree light string, a portion of the electrically conducting means being formed by the conductors of the Christmas Tree light string, generation of a voltage by the piezoelectric crystal causing an arc across a broken filament in a bulb of the Christmas Tree string to provide a visual detection of the bulb having the broken filament.

* * * * *